E. J. AITKEN.
HORSE HITCH.
APPLICATION FILED DEC. 20, 1910.
1,009,032.
Patented Nov. 21, 1911.
2 SHEETS—SHEET 1.
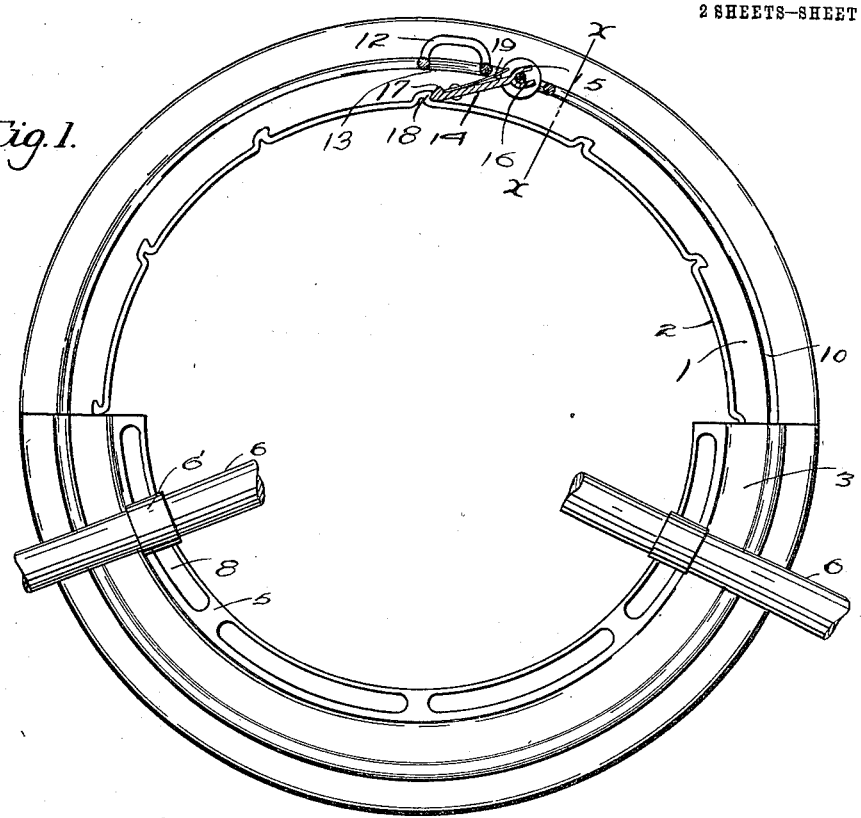
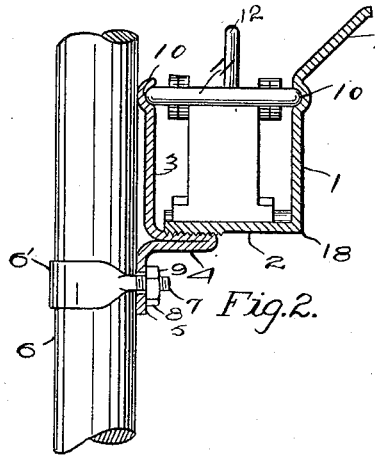
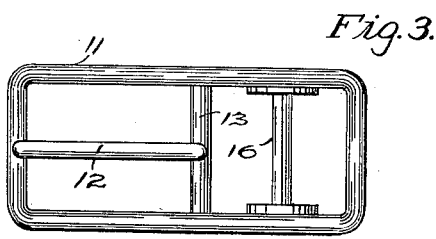
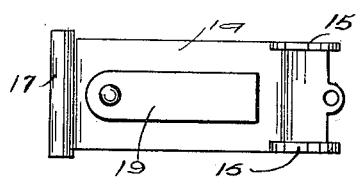
Witnesses
H. A. Stark.
J. F. Dyer
Inventor
Edwin J. Aitken
By E. E. Vrooman
Attorney.

E. J. AITKEN.
HORSE HITCH.
APPLICATION FILED DEC. 20, 1910.
1,009,032.
Patented Nov. 21, 1911.
2 SHEETS—SHEET 2.
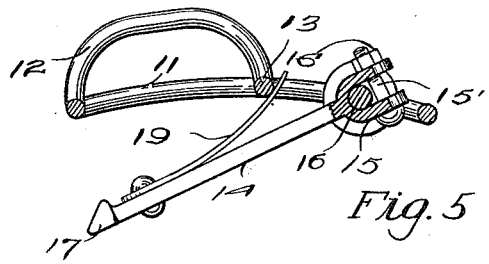
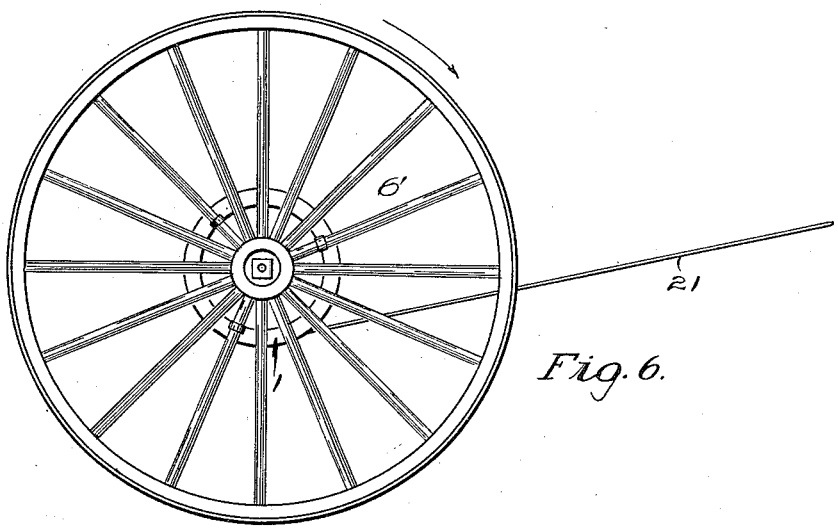
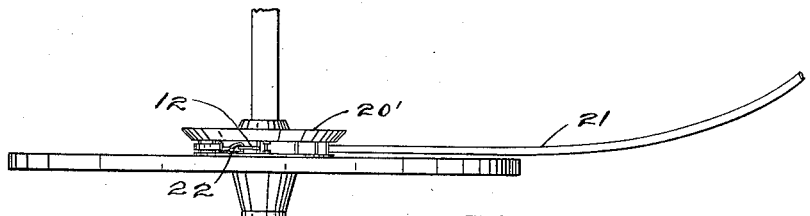
Inventor
Edwin J. Aitken.

UNITED STATES PATENT OFFICE.

EDWIN J. AITKEN, OF OAKLAND, CALIFORNIA.

HORSE-HITCH.

1,009,032. Specification of Letters Patent. Patented Nov. 21, 1911.

Application filed December 20, 1910. Serial No. 598,282.

*To all whom it may concern:*

Be it known that I, EDWIN J. AITKEN, a citizen of the United States, residing at Oakland, in the county of Alameda and State of California, have invented certain new and useful Improvements in Horse-Hitches, of which the following is a specification.

This invention relates to devices for hitching horses and has special reference to that class of devices in which the reins may be secured to the wheel of a vehicle so that in case during the absence of the driver the horse attempts to move away the reins will be wound up on a device connected with a wheel of a vehicle and be drawn back as the horse advances so as to restrain him from continuing to advance.

The invention has for its object to provide an improved device of this character which will be simple in construction and effective in operation and may readily be released when it is necessary for the driver to resume control of the reins.

Referring to the accompanying drawings:—Figure 1 is an enlarged detail view of a device with parts broken away and a portion of two spokes of a wheel, said device being constructed in accordance with this invention. Fig. 2 is an enlarged detail view in cross section on the line X—X of Fig. 1, showing a portion of the device and of a spoke to which said device is attached. Fig. 3 is an enlarged detail view of a member employed with the device shown in Fig. 2 for securing the ends of a pair of reins. Fig. 4 is an enlarged detail view of a pawl employed with the device shown in Figs. 1 and 2. Fig. 5 is an enlarged detail view, partly in section of the pawl shown in Fig. 4, and a portion of the device shown in Fig. 3 to which said pawl is hinged. Fig. 6 is a side view of a wheel showing the device attached thereto and a pair of reins connected therewith. Fig. 7 is a view of a device shown in Fig. 6, looking down on the top of the wheel.

In carrying out the invention, a metallic ring is provided adapted to be attached to the spokes of a vehicle wheel and constructed and arranged as follows: A portion of said ring consists of an annular metallic ring formed with the sides 1 and 2 located at a right angle to each other and in conjunction with the angular ring there is employed an annular metallic plate 3 opposite to and parallel with the side 1 of the first named angular ring, and having a folded portion 4 extending at a right angle to the plate 3 and in threaded engagement with the side 2 of the angular ring. The plate 3 has an annular flanged portion 5 extending at a right angle to the folded portion 4, and is detachably secured to the spokes 6 on a vehicle by means of metallic strips 6' which fit over a spoke and are provided with threaded lugs 7 which project through a slot 8 in the flange 5 which is clamped to the spoke by means of nuts 9 on the lugs 7. The angular member and the annular plate 3 are each formed with an inner annular groove 10 at the open end of the ring formed by said members and seated in said grooves 10 and adapted to slide therein is a member 11 consisting of a rod bent in the form of an oblong rectangle and provided with a metallic loop 12 which projects upward from said member 11 and is secured at one end to one end of said member and at its other end to the cross bar 13 of said member.

14 indicates a latch which consists of an oblong flat piece of metal formed with U-shaped projections 15 at one end which straddle across bar or rod 16 in the member 11 and are held in pivotal engagement therewith by means of bolts 15' and nuts 16'. The latch depends in the ring formed by the angular member and the annular plate 3 and is formed at its outer end with a tapering shouldered portion 17 which rests loosely on the bottom of the annular member 2 and is adapted to engage transverse ribs or lugs 18 formed in the bottom of the annular member 2. The latch 14 is held in yielding engagement with the bottom of the member 2 by means of a spring 19 mounted on the latch 14 bearing beneath the transverse bar 13 of the member 11. It will be seen by means of the spring 19 that in one direction of movement of the member 11 in the grooves 10 the latch may yield and pass over the lugs 18 and in the opposite direction of the member 11 may be held down against the bottom of the member 2 so as to be brought into engagement with one of the lugs 18.

The side 1 of the angular ring is formed with an outwardly flaring flange 20 which serves to hold the reins connected to the annular ring from slipping off of the same. The reins 21 are secured to the member 11 in any suitable manner, as for example by a snap hook 22 which engages the loop 12 of the member 11. The end of the reins extending part way about the annular ring and secured to the member 11 will if the horse attempts to start be drawn about the annular ring by the forward movement of the wheel, the latch 14 being in engagement with one of the lugs 18 and by this movement the reins will be drawn more and more taut as the horse attempts to advance, and the vehicle wheel is drawn forward. It will be seen that the more the horse attempts to move forward, the tighter the reins will be drawn so as to bring him to a stop. The reins are readily slackened by detaching the snap hook from the loop 12 and by backing the vehicle which will enable the member to move forward and the latch 14 to be released from the lug 18.

It will be seen that by means of the construction specified, the several parts may be readily separated for repair or other purposes and the entire device readily attached to and detached from the spokes of a vehicle wheel.

Having described the invention, what I claim as new is:

1. In a device of the character described, a vehicle wheel, an annular member secured to the spoke of said wheel and consisting of an angular ring and an annular plate forming with said angular ring a gutter shaped ring, said gutter shaped ring having its bottom provided with a plurality of lugs and an annular groove on each side of the inner sides of said gutter, a member consisting of a rod bent in the form of an oblong rectangle, located in and slidable in said grooves, and provided with a metallic loop projecting upwardly from said member and secured to said member, and a latch consisting of an oblong piece of flat metal hinged to said slidable member, and adapted to engage said lugs, and move over the same in the opposite movement of said member.

2. In a device of the character described, a vehicle wheel, an annular gutter shaped ring consisting of an angular annular ring, and an annular plate detachably secured to said angular ring and having a flange with slots, metallic straps mounted on the spokes of said wheel and detachably connected to said flange, said gutter shaped ring being provided with a longitudinal groove on each of its inner sides, a frame slidable in said grooves and having a loop projecting therefrom, a latch hinged to said frame and having its free end bearing against the bottom of said gutter shaped ring, and lugs in said gutter shaped ring adapted to engage said latch in one direction of movement of the slidable frame, said latch having a spring adapted to hold it in yielding engagement with the lugs on the bottom of said gutter shaped ring whereby in one direction of movement of the vehicle wheel the latch will engage one of said lugs and lock said slidable member and cause a pair of reins attached thereto to be drawn about said annular gutter shaped ring.

In testimony whereof I affix my signature in presence of two witnesses.

EDWIN J. AITKEN.

Witnesses:
Jno. F. Dryer,
H. C. Schroeder.

---

Copies of this patent may be obtained for five cents each, by addressing the " Commissioner of Patents, Washington, D. C."